526
T. P. Costello,
Skate,
NO PRINTED SPECIFICATION AVAILABLE.
No 266, A.I. Patented Feb. 28, 1860.
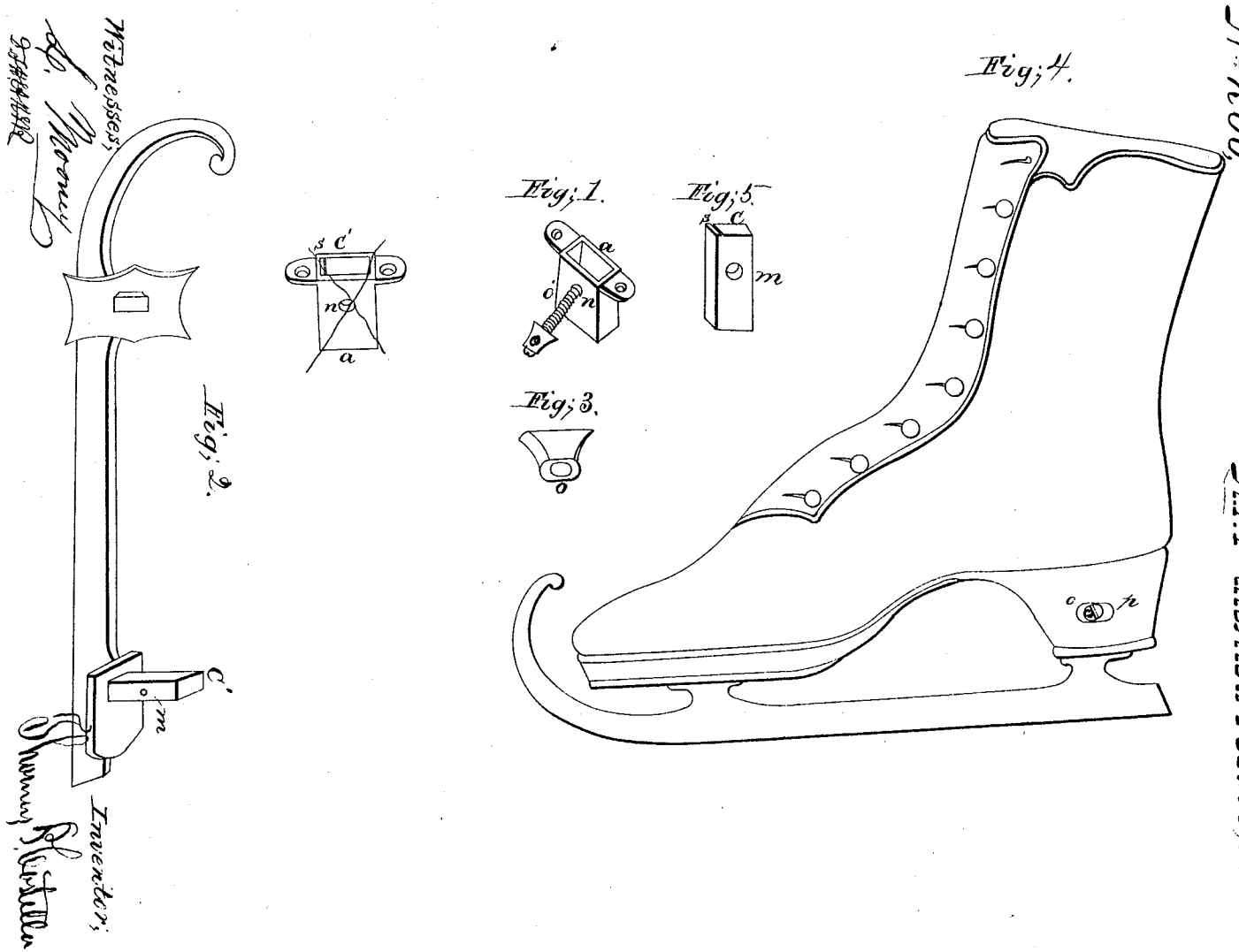
AM. PHOTO-LITHO. CO. N.Y. (OSBORNE'S PROCESS)